US008973678B1

(12) United States Patent
Cooley et al.

(10) Patent No.: US 8,973,678 B1
(45) Date of Patent: Mar. 10, 2015

(54) MISSPELLED WORD ANALYSIS FOR UNDESIRABLE MESSAGE CLASSIFICATION

(75) Inventors: Shaun Cooley, El Segundo, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 2171 days.

(21) Appl. No.: 11/562,941

(22) Filed: Nov. 22, 2006

(51) Int. Cl.
*G06F 17/00* (2006.01)

(52) U.S. Cl.
USPC ............................................ 175/257

(58) Field of Classification Search
CPC ............................. G06F 17/273; G06Q 10/107
USPC ............................................................ 715/257
See application file for complete search history.

(56) References Cited

U.S. PATENT DOCUMENTS

| 5,970,492 | A * | 10/1999 | Nielsen | 707/10 |
| 6,654,787 | B1 * | 11/2003 | Aronson et al. | 709/206 |
| 7,254,773 | B2 * | 8/2007 | Bates et al. | 715/256 |
| 7,519,565 | B2 * | 4/2009 | Prakash et al. | 706/20 |
| 7,627,670 | B2 * | 12/2009 | Haverkos | 709/224 |
| 2005/0223326 | A1 * | 10/2005 | Chang et al. | 715/533 |
| 2006/0047769 | A1 * | 3/2006 | Davis et al. | 709/207 |
| 2007/0094500 | A1 * | 4/2007 | Shannon et al. | 713/170 |

OTHER PUBLICATIONS

Lee, Honglak, and Andrew Y. Ng. "Spam Deobfuscation using a Hidden Markov Model." CEAS 2005, p. 1-8.*

Ahmed et al, "Word Stemming to Enhance Spam Filtering", 2004, in Proceedings of Conference on Email and Anti-Spam (CEAS), p. 1-2.*

Reference: M. Sahami, S. Dumais, D. Heckerman, and E. Horvitz. A Bayesian approach to filtering junk email., AAAI Workshop on Learning for Text Categorization, Jul. 1998, Madison, Wisconsin, p. 1-8.*

Androutsopoulos et al., "An Experimental Comparison of Naive Bayesian and Keyword-Based Anti-Spam Filtering with Personal E-mail Messages", copyright 2000, ACM. p. 1-8.*

Spam Probe "Welcome to SpamProbe", p. 1-3, http://spamprobe.sourceforge.net/ copyright 2002-2005.*

Tretyakov, "Machine Learning Techniques in Spam Filtering", Data Mining Problem-oriented Seminar, MTAT.03.177, May 2004, p. 60-79.*

Tschabitscher, "What You Need to Know About Bayesian Spam Filtering", retrieved from Internet Archive Wayback Machine capture of About.com, dated Jul. 31, 2004, p. 1-4.*

* cited by examiner

*Primary Examiner* — Amelia Tapp
(74) *Attorney, Agent, or Firm* — Brill Law Office; Jeffrey Brill

(57) ABSTRACT

Misspelled words are identified in incoming email messages. The presence of misspelled words in emails is used to help determine which the emails are spam. Various statistical information concerning the number, prevalence, distribution, etc. of misspelled words in email messages is analyzed to detect spam or other forms of undesirable email, such as phishing emails. In some embodiments, the language in which an email is written is identified in order to aid in the identification of misspelled words. In some embodiments, the analysis of the misspelling information is combined with other techniques used to identify undesirable email.

20 Claims, 1 Drawing Sheet

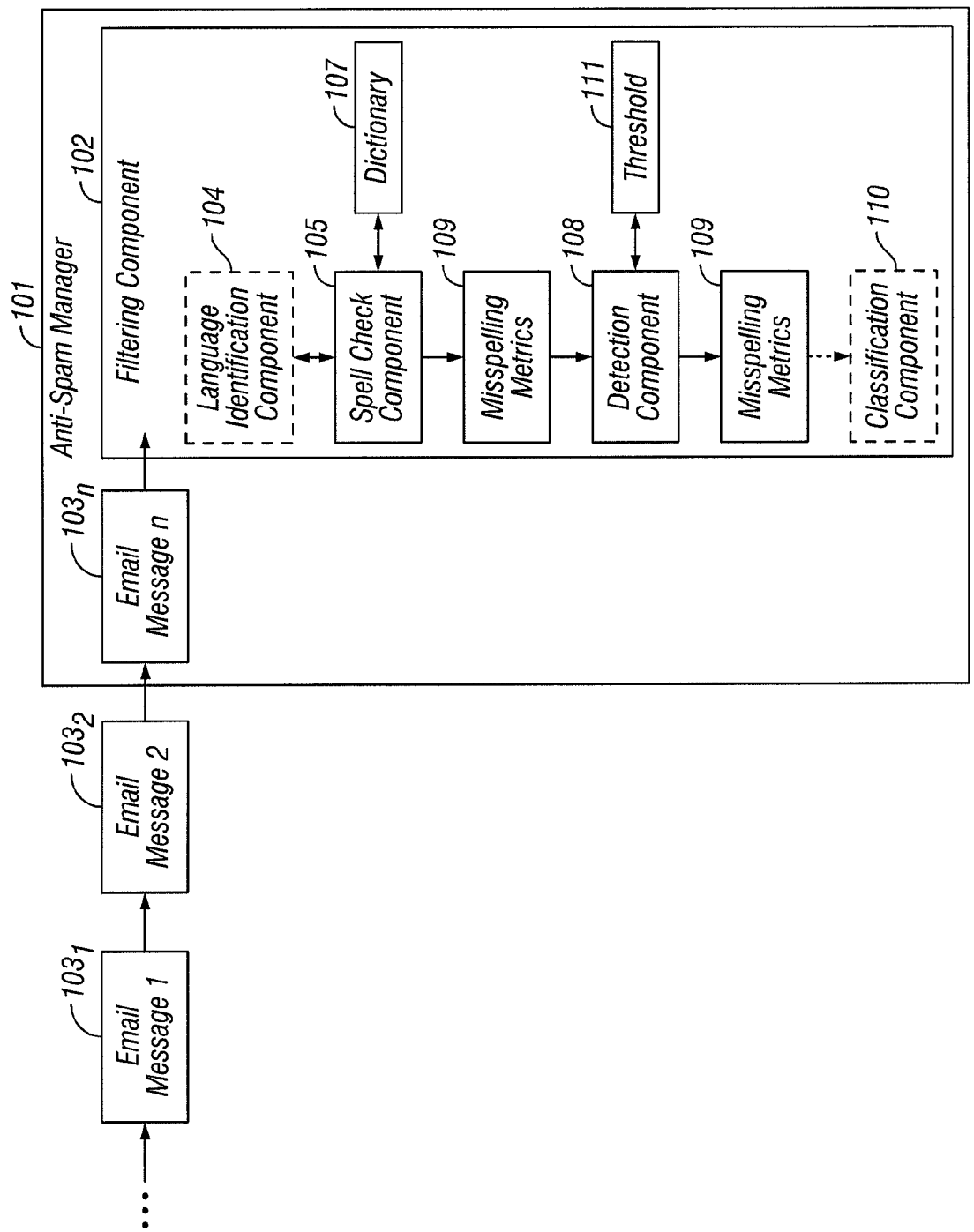

MISSPELLED WORD ANALYSIS FOR UNDESIRABLE MESSAGE CLASSIFICATION

TECHNICAL FIELD

This invention pertains generally to computer security and more specifically to identifying undesirable electronic messages.

BACKGROUND

Current statistical spam detection techniques rely heavily on their ability to find words that are known to be associated with spam email during classification of electronic messages. The authors of spam emails have become aware of this, and have started to purposefully misspell words in their messages. Most legitimate email contains many more correctly spelled words than misspelled words. On the other hand, a lot of spam email (especially short spam messages) often contains so many misspelled words that it is difficult to read at normal speed. Additionally, phishing emails are well known for containing spelling errors.

What is needed are methods, computer readable media and computer systems for allowing detection of undesirable emails, even where misspelled words have been inserted.

SUMMARY

Misspelled words are identified in incoming email messages. The presence of misspelled words in emails is used to help determine which of the emails are spam. Various statistical information concerning the number, prevalence, distribution, etc. of misspelled words in email messages is analyzed to detect spam or other forms of undesirable email, such as phishing emails. In some embodiments, the language in which an email is written is identified in order to aid in the identification of misspelled words. In some embodiments, the analysis of the misspelling information is combined with other techniques used to identify undesirable email.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a block diagram illustrating the operation of an anti-spam manager, according to some embodiments of the present invention.

The FIGURES depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates an anti-spam manager 101, according to some embodiments of the present invention. It is to be understood that although the anti-spam manager 101 is illustrated as a single entity, as the term is used herein an anti-spam manager 101 refers to a collection of functionalities which can be implemented as software, hardware, firmware or any combination of these. Where an anti-spam manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a filtering component 102 of the anti-spam manager 101 filters incoming email messages 103 so that the emails 103 can be further analyzed. As the term is used herein, filtering incoming email messages 103 simply refers to identifying incoming email messages 103 and processing them in some way before the messages arrive at their target destination. Various mechanisms are known by those of ordinary skill in the art for filtering an email 103 stream, all of which can be used within the context of the present invention. For example, anything from a plug-in to a simple mail transfer protocol server to a proxy server or a gateway can be used for message 103 filtering. So as not to distract from the explanation of the functionality of interest, these specific instantiations of the filtering component 102 are not separately illustrated.

In some embodiments of the present invention, a language identification component 104 of the anti-spam manager 101 performs language identification of the filtered email messages 103 (i.e., identification of the primary language in which the message 103 is written). Various techniques for language identification are known by those of ordinary skill in the relevant art. Most such techniques involve performing an n-gram based statistical analysis of the content of the message 103. In other words, combinations of symbols of various lengths (n-grams) are identified in the message 103, and a statistical analysis is performed, which takes into account in which language the detected n-grams are most likely to appear. As such, even if the majority of words are misspelled, they typically contain enough very similar bi-grams or tri-grams for the language identification to succeed. In some embodiments, no language identification is performed, and instead a default language (e.g., English) is assumed. In some other embodiments, language identification is performed, but a default language is assumed in the unlikely event that the language identification fails.

A spell check component 105 of the anti-spam manager 101 runs a spell check on incoming messages 103 (e.g., by using an appropriate language specific dictionary 107). The spell check component 105 performs a spell check much like any word processor, except that instead of correcting misspelled words, the spell check component 105 collects relevant statistics ("misspelling metrics") 109. The statistics 109 can include information such as the number of misspelled words in a message 103, the total number of words in the message 103, the number of sentences that contain exactly one misspelled word, the total number of sentences that contain exactly two misspelled words, the total number of sentences that contain exactly three misspelled words, the total number of sentences that contain four or more misspelled words (and so on), the total number of sentences, the average number of misspelled words per sentence, the average number of words per sentence, etc. The exact misspelling metrics 109 to collect is a variable design choice.

A detection component 108 subjects the incoming messages 103 to spam detection. The detection component 108 receives the misspelling metrics 109, and uses them as an aid in the spam detection process. In one embodiment, the detection component 108 comprises a threshold analyzer, which simply checks whether any of the misspelling metrics 109 exceed a set threshold 111 (such as average misspelled words per sentence greater than 50% of average number of words per sentence, ratio of misspelled words to total visible words in the message exceeding 40%, etc.). In one such embodiment, if a misspell metric 109 exceeds a corresponding threshold value 111, the message 103 is classified as spam. In other embodiments, the detection component 108 only adjudicates the email 103 to be spam in response to a minimum number of metrics 109 or specific combinations of metrics 109 exceeding corresponding threshold values 111. In yet other embodiments, one or more metrics 109 exceeding the threshold value(s) 111 is taken as one piece of evidence against the legitimacy of the message 103. It is to be understood that the specific threshold values 111 to use are variable design parameters, which can be adjusted up or down as desired.

In many embodiments, the misspelling metric 109 analysis is not used in isolation. For example, in some embodiments the misspelling metrics 109 can be used as one of multiple heuristics in a heuristic analysis of messages 103 to identify spam. In some embodiments, existing techniques of mitigating false positive adjudications of emails by pre-filtering legitimate email 103 can be used in conjunction with an analysis of misspelling metrics 109 (and, optionally, in combination with any of the many other heuristics at play in an antispam implementation). In some embodiments the detection component 108 comprises a statistical engine which performs a statistical analysis of electronic message 103 content in order to identify statistical patterns associated with undesirable electronic messages 103, using misspelling metrics as one factor in the statistical analysis. For example, the statistical engine can utilize the misspelling metrics 109 as one additional domain specific input feature to a classification component 110. In this context, the misspelling metrics 109 can be combined with other input features to help the classification component 110 determine the proper category for the associated message 103. As will be understood by those of ordinary skill in the relevant art in light of this specification, the misspelling metric 109 analysis can be used as an additional feature in any system used to detect spam and/or other forms of undesirable messages, such as phishing attempts. It is to be further understood that various techniques for undesirable email detection are known to those of ordinary skill in the relevant art, and the use of any of these in combination with misspelling metric 109 analysis is within the scope of the present invention.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for identifying undesirable electronic messages from specific misspellings, the method comprising the steps of:
   identifying electronic messages that have been categorized as spam;
   identifying specific misspelled words within content of the spam electronic messages;
   collecting misspelling statistical metrics for the content of the spam electronic messages based on the identified specific misspelled words; and
   for an incoming electronic message, analyzing misspelling metrics to determine if the incoming electronic message is an undesirable electronic message by matching the statistical metrics of spam electronic messages based on the specific misspelled words to misspelled words within the incoming electronic message,
   wherein each step of the method is performed by a computer.

2. The method of claim 1 further comprising:
   identifying a language in which an identified electronic message is composed, prior to identifying misspelled words in the identified electronic message; and
   taking into account the identified language in identifying misspelled words in the identified electronic message.

3. The method of claim 2 further comprising:
   using an identified language specific electronic dictionary to identify misspelled words in the identified electronic message.

4. The method of claim 1 wherein analyzing misspelling metrics for identified electronic messages to identify undesirable electronic messages further comprises:
   performing a statistical analysis of electronic message content in order to identify statistical patterns associated with undesirable electronic messages, using misspelling metrics as a factor in the statistical analysis.

5. The method of claim 1 wherein analyzing misspelling metrics for identified electronic messages to identify undesirable electronic messages further comprises:
   performing a heuristic analysis of electronic message content in order to identify undesirable electronic messages, using misspelling metrics as a heuristic in the heuristic analysis.

6. The method of claim 1 wherein analyzing misspelling metrics for identified electronic messages to identify undesirable electronic messages further comprises:

using data concerning a relationship between at least one misspelling metric and at least one threshold value as evidence in the identification of an electronic message as undesirable.

7. The method of claim 1 further comprising determining that at least one received electronic message comprises a type of undesirable electronic message from a group of undesirable electronic message types consisting of:
   a spam email; and
   a phishing email.

8. At least one non-transitory computer readable medium containing a computer program product for identifying undesirable electronic messages from specific misspellings, the computer program product comprising program code to:
   to identify electronic messages that have been categorized as spam;
   to identify specific misspelled words within content of the spam electronic messages;
   to collect misspelling statistical metrics for the content of the spam electronic messages based on the identified specific misspelled words; and
   for an incoming electronic message, to analyze misspelling metrics to determine if the incoming electronic message is an undesirable electronic message by matching the statistical metrics of spam electronic messages based on the specific misspelled words to misspelled words within the incoming electronic message.

9. The computer program product of claim 8 further comprising program code to:
   identify a language in which an identified electronic message is composed, prior to identifying misspelled words in the identified electronic message; and
   take into account the identified language in identifying misspelled words in the identified electronic message.

10. The computer program product of claim 9 further comprising program code to:
    use an identified language specific electronic dictionary to identify misspelled words in the identified electronic message.

11. The computer program product of claim 8 wherein analyzing misspelling metrics for identified electronic messages to identify undesirable electronic messages further comprises program code to:
    perform a statistical analysis of electronic message content in order to identify statistical patterns associated with undesirable electronic messages, using misspelling metrics as a factor in the statistical analysis.

12. The computer program product of claim 8 wherein the analyzing misspelling metrics for identified electronic messages to identify undesirable electronic messages further comprises program code to:
    perform a heuristic analysis of electronic message content in order to identify undesirable electronic messages, using misspelling metrics as a heuristic in the heuristic analysis.

13. The computer program product of claim 8 wherein analyzing misspelling metrics for identified electronic messages to identify undesirable electronic messages further comprises program code to:
    use data concerning a relationship between at least one misspelling metric and at least one threshold value as evidence in the identification of an electronic message as undesirable.

14. The computer program product of claim 8 further comprising program code to:
    determine that at least one received electronic message comprises a type of undesirable electronic message from a group of undesirable electronic message types consisting of:
    a spam email; and
    a phishing email.

15. A computer system for identifying undesirable electronic messages from specific misspellings, the computer system comprising:
    a processor;
    a computer memory, comprising:
       a first module to identify electronic messages that have been categorized as spam;
       a second module to identify specific misspelled words within content of the spam electronic messages;
       a third module to collect misspelling statistical metrics for the content of the spam electronic messages based on the identified specific misspelled words; and
       a fourth module to for an incoming electronic message, analyze misspelling metrics to determine if the incoming electronic message is an undesirable electronic message by matching the statistical metrics of spam electronic messages based on the specific misspelled words to misspelled words within the incoming electronic message.

16. The computer system of claim 15 wherein the memory further comprises:
    a fifth module to identify a language in which an identified electronic message is composed, prior to identifying misspelled words in the identified electronic message; and
    an executable image stored in the computer memory configured to take into account the identified language in identifying misspelled words in the identified electronic message.

17. The computer system of claim 16 wherein the memory further comprises:
    a sixth module to use an identified language specific electronic dictionary to identify misspelled words in the identified electronic message.

18. The computer system of claim 15 wherein the fourth module is further configured to:
    perform a statistical analysis of electronic message content in order to identify statistical patterns associated with undesirable electronic messages, using misspelling metrics as a factor in the statistical analysis.

19. The computer system of claim 15 wherein the fourth module is further configured to:
    perform a heuristic analysis of electronic message content in order to identify undesirable electronic messages, using misspelling metrics as a heuristic in the heuristic analysis.

20. The computer system of claim 15 wherein the fourth module is further configured to:
    use data concerning a relationship between at least one misspelling metric and at least one threshold value as evidence in the identification of an electronic message as undesirable.

* * * * *